(12) United States Patent
McGrath (10) Patent No.: US 12,215,822 B2
(45) Date of Patent: *Feb. 4, 2025

(54) BRACKET ASSEMBLY

(71) Applicant: Advanced Design MFG LLC, Antioch, CA (US)

(72) Inventor: Andrew Hascall McGrath, Lafayette, CA (US)

(73) Assignee: ADVANCED DESIGN MFG LLC, Antioch, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,240

(22) Filed: Nov. 15, 2023

(65) Prior Publication Data

US 2024/0159353 A1 May 16, 2024

Related U.S. Application Data

(63) Continuation of application No. 17/521,297, filed on Nov. 8, 2021, now Pat. No. 11,852,287.

(51) Int. Cl.
| | |
|---|---|
| *F16M 13/02* | (2006.01) |
| *F16M 11/24* | (2006.01) |
| *A47B 96/06* | (2006.01) |
| *A47B 96/14* | (2006.01) |
| *A47F 10/06* | (2006.01) |

(Continued)

(52) U.S. Cl.
CPC .......... *F16M 13/022* (2013.01); *F16M 11/24* (2013.01); *A47B 96/06* (2013.01); *A47B 96/14* (2013.01); *A47F 2010/065* (2013.01); *F16B 9/00* (2013.01); *F16M 11/10* (2013.01); *F16M 11/2014* (2013.01)

(58) Field of Classification Search
CPC ...... F16M 13/022; F16M 11/24; F16M 11/10; F16M 11/2014; F16M 11/2028; F16M 2200/025; F16M 2200/022; F16M 2200/027; A47B 96/06; A47B 96/14; A47F 10/00; A47F 2010/065; F16B 9/00
See application file for complete search history.

(56) References Cited

U.S. PATENT DOCUMENTS

| | | |
|---|---|---|
| 8,196,872 B1 | 6/2012 | McGrath |
| 8,302,919 B1 | 11/2012 | McGrath |

(Continued)

FOREIGN PATENT DOCUMENTS

| | | | | |
|---|---|---|---|---|
| CN | 104882129 B | * | 8/2018 | ........... F16M 11/046 |
| WO | WO-03035997 A1 | * | 5/2003 | ........... E04F 11/1817 |

*Primary Examiner* — Tan Le
(74) *Attorney, Agent, or Firm* — Quarles & Brady, LLP (57) ABSTRACT

A bracket assembly includes a supporting bar, a cylindrical member configured to slidably receive the supporting bar, an annular cap configured to removably couple with the cylindrical member, an arm extending outwardly from the annular cap, a torque cartridge, and a clamping element configured to releasably hold a frame. The torque cartridge includes a first portion and a second portion rotatably coupled with the first portion. The first portion of the torque cartridge is received within the arm such that the second portion of the torque cartridge is rotatable relative to the first portion and to the arm. The clamping element is coupled with the second portion of the torque cartridge at an outer end of the arm such that the clamping element is rotatable relative to the arm and to the annular cap.

23 Claims, 7 Drawing Sheets

(51) Int. Cl.
  *F16B 9/00* (2006.01)
  *F16M 11/10* (2006.01)
  *F16M 11/20* (2006.01)

(56) References Cited

U.S. PATENT DOCUMENTS

| | | | |
|---|---|---|---|
| 8,936,223 B1 * | 1/2015 | McGrath | F16C 11/103 |
| | | | 248/220.21 |
| 8,973,876 B1 | 3/2015 | McGrath | |
| 9,962,439 B2 | 5/2018 | Matsushita | |
| 11,852,287 B2 * | 12/2023 | McGrath | F16M 11/2028 |
| 2010/0045149 A1 | 2/2010 | English | |
| 2011/0169384 A1 * | 7/2011 | Padden | A47F 10/06 |
| | | | 312/140.4 |
| 2012/0200207 A1 | 8/2012 | Atkins | |
| 2013/0026312 A1 | 1/2013 | Wang | |
| 2016/0235222 A1 * | 8/2016 | Atkins | A47F 10/06 |
| 2018/0242760 A1 | 8/2018 | Cummings | |

* cited by examiner

BRACKET ASSEMBLY

CROSS-REFERENCES TO RELATED APPLICATIONS

The present application is a continuation of U.S. patent application Ser. No. 17/521,297, filed on Nov. 8, 2021, which is incorporated herein by reference in its entirety.

STATEMENT REGARDING FEDERALLY SPONSORED RESEARCH

Not Applicable.

FIELD OF THE DISCLOSURE

The present invention relates to an assembly for support structures, and more particularly, relates to a bracket assembly for quick and easy coupling of frame and support structures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Conventional support structures generally include permanent support structures and non-permanent support structures. Permanent support structures are commonly used as decks, sheds, lofted beds, and other structures that may need to be efficiently assembled. On the other hand, non-permanent support structures are commonly used in a wide range of settings, such as wood storage racks, temporary storage crates, stages and runways, and other structures that may need to be efficiently assembled and disassembled. Further, some conventional support structures provide for adjustable height supports and bracketing. Such support structures typically include an upright support member for supporting a platform or a frame and an assembly for securing the upright support member, which is commonly referred to as a bracket assembly.

However, designing and assembling the bracket assembly can be complicated since dimensions, load factors, code requirements, and aesthetics converge to present bracket assemblies that are labor intensive to assembly numerous components thereof. For example, some bracket assemblies have many component parts and require several tools for assembling the bracket assembly. Moreover, conventional bracket assemblies or positional adjustment of an assembled bracket assembly may require more than one person and can be time consuming. Further, some conventional ready-to-assemble bracket assemblies utilize location dependent upright support members that exponentially increase effort needed to design and assemble the bracket components thereof. Still further, such bracket assemblies may need to be supported by adequate and aesthetically pleasing attachment components for securing the assembly to one or more fixed support structures.

As one particular example of the prior art, a wall mounting system includes a fastening member that includes one or more mounting studs and one or more anchor apertures. The fastening member is configured to be anchored to a support structure by one or more fasteners disposed through the one or more anchor apertures. The wall mounting system also includes a bushing assembly having an inner portion and an outer portion. The inner portion further includes a through-hole that is configured to receive a mounting stud. The outer portion is configured to rotate about the inner portion and includes at least one set screw aperture that is configured to align with a set screw aperture of an accessory sleeve to receive a set screw therein. It should be appreciated that rotation of the outer portion about the inner portion enables indexing of the set screw aperture about a longitudinal axis of the bushing assembly. However, the example wall mounting system still does not facilitate rotation of a bracket assembly along a supporting bar thereof.

Given the deficiencies of the prior art described above, there is a need for an effective and improved design of a bracket assembly that is more easily assembled, provides a more easily adjustable height, and can hold multiple frames without perforating the frame.

BRIEF SUMMARY

According to embodiments disclosed herein, a first bracket assembly for supporting a plurality of frames can include a cylindrical member that can be configured to receive a supporting bar. The cylindrical member can hold a first part of the supporting bar and can include a first opening and a second opening. The cylindrical member can be a hollow cylinder threaded on an inner surface thereof. In one embodiment, the cylindrical member can include a plurality of axial grooves integrated on an outer surface of the cylindrical member to provide appropriate gripping. In an embodiment, the supporting bar can be part of an assembly for adjustable height and an internal threaded fastener member. The first bracket assembly can further include a cylindrical core housed in the cylindrical member from the second opening of the cylindrical member. In one embodiment, the cylindrical core can be threaded for coupling with the inner surface of the cylindrical member. Further, the cylindrical core can include a stepped section, a threaded section, a locking element, and a plurality of slotted openings. In one embodiment, the stepped section of the cylindrical core can be configured to receive the first part of the supporting bar. In one embodiment, the threaded section of the cylindrical core can be coupled with the inner surface of the cylindrical member. Further, the locking element of the cylindrical core can be configured to lock the second opening of the cylindrical member.

In one embodiment, the plurality of slotted openings can be integrated along a longitudinal axis of the cylindrical core and can be configured to receive the plurality of threaded fasteners. The first bracket assembly can further include an annular cap that can be press fitted at the second opening of the cylindrical member for providing support to the cylindrical member and the supporting bar can be coupled to the first bracket assembly via the annular cap. Further, the annular cap can be configured to close a cylindrical member housing of the cylindrical core from the second opening of the cylindrical member. The first bracket assembly can further include a torque cartridge housing that can be transversely fitted into the cylindrical member and the cylindrical core. The torque cartridge housing can be a hollow cylindrical section press fitted at one end to the annular cap and a torque cartridge can be housed with the hollow cylindrical section of the torque cartridge housing.

The torque cartridge can include a first portion with a first end that can be coupled to the cylindrical core and a second portion with a first end that can be rotatably coupled at a second end of the first portion. The first bracket assembly can further include a clamping element that can be coupled to a second end of the second portion for holding the plurality of frames. The torque cartridge can provide an infinite smooth pivoting movement between the first portion and the second portion of the torque cartridge. Thus, such a bracket assembly can provide a solution to adjust height of the supporting bar for holding a plurality of frames having infinite pivoting movement around the supporting bar.

In one embodiment, the first portion of the torque cartridge can include a cylindrical housing and the second portion of the torque cartridge can include a shaft. Further, the torque cartridge housing can correspond as a hollow guide for receiving the shaft of the first portion and the second portion by performing a rotation. In one embodiment, the first bracket assembly can further include a plate coupled between the first and second portions of the torque cartridge to provide smooth rotary movement. In another embodiment, the first bracket assembly can further include a plurality of threaded fasteners that can be coupled to the cylindrical member, the cylindrical core, and the annular cap.

In another embodiment, a second bracket assembly can be connected to a second part of the supporting bar in an opposite direction relative to the first bracket assembly, which can be connected to the first part of the supporting bar. The first part of the supporting bar can be an upper part and the second part of the supporting bar can be a lower part. In one embodiment, a cylindrical member of the second bracket assembly receiving the second part of the supporting bar can be configured to be movable along a length of the supporting bar. In another embodiment, the cylindrical member receiving the second part of the supporting bar can be configured to be moveable along the length of the supporting bar towards or away from the cylindrical member receiving the first part of the supporting bar. In one embodiment, the supporting bar may facilitate movement of the second bracket assembly towards or away from the first bracket assembly.

In some aspects, the present disclosure provides a bracket assembly that can include a supporting bar, a cylindrical member that can be configured to slidably receive the supporting bar, an annular cap that can be configured to removably couple with the cylindrical member, an arm that can extend outwardly from the annular cap, a torque cartridge, and a clamping element that can be configured to releasably hold a frame. The torque cartridge can include a first portion and a second portion rotatably coupled with the first portion. The first portion of the torque cartridge can be received within the arm such that the second portion is rotatable relative to the first portion and to the arm. The clamping element can be coupled with the second portion of the torque cartridge at an outer end of the arm such that the clamping element is rotatable relative to the arm and to the annular cap.

In some aspects, the clamping element can be rotatable relative to the arm in an angular range of at least 360 degrees about a longitudinal axis of the arm. In some aspects, the clamping element can be securable in one of a plurality of rotational positions relative to the arm via only the torque cartridge. In some aspects, the longitudinal axis of the arm can be substantially perpendicular to a longitudinal axis of the supporting bar.

In some aspects, the annular cap can be configured to slidably receive the supporting bar. In some aspects, the cylindrical member and the annular cap can be removably securable at one of a plurality of positions along a length of the supporting bar when the annular cap is coupled with the cylindrical member.

In some aspects, at least a portion of the supporting bar can have a shape of a hollow cylinder.

In some aspects, the cylindrical core can be a first cylindrical core, the annular cap can be a first annular cap having a first arm, and the clamping element can be a first clamping element, and the bracket assembly can further include a second cylindrical member that can be configured to slidably receive the supporting bar, a second cylindrical core that can be configured to slidably receive the supporting bar and to engage the second cylindrical member, a second annular cap that can be configured to engage the second cylindrical core and can have a second arm extending outwardly therefrom, and a second clamping element that can be rotatable relative to the second arm. In some aspects, the first and second clamping elements can be configured to releasably hold the frame. In some aspects, the first clamping element can be configured to releasably hold a first frame and the second clamping element can be configured to releasably hold a second frame.

In some aspects, the present disclosure provides a bracket assembly that can include a supporting bar, a cylindrical member that can be configured to slidably receive the supporting bar, a cylindrical core that can be configured to slidably receive the supporting bar and to engage the cylindrical member, an annular cap that can be configured to engage the cylindrical core and can have an arm extending outwardly therefrom, a torque cartridge, and a clamping element. The torque cartridge can include a first portion and a second portion that can rotatably coupled with the first portion. The first portion of the torque cartridge can be received within the arm such that the second portion is rotatable relative to the first portion and to the arm. The clamping element can be coupled with the second portion of the torque cartridge such that the clamping element is rotatable relative to the arm and to the annular cap.

In some aspects, the annular cap can be configured to slidably receive the supporting bar such that the cylindrical member, the cylindrical core, and the annular cap are removably securable at one of a plurality of positions along a length of the supporting bar.

In some aspects, the cylindrical member can be configured to removably receive one end of the cylindrical core, and the annular cap can be configured to removably receive another end of the cylindrical core, opposite the cylindrical member. In some aspects, the cylindrical member can be threadably securable to the cylindrical core. In some aspects, the cylindrical core can be configured to clamp a portion of the supporting bar when the cylindrical member is threadably secured to the cylindrical core to movably secure the cylindrical core and the annular cap to the supporting bar. In some aspects, the cylindrical core can include one or more locking elements that can be configured to prevent rotation of the cylindrical member relative to the cylindrical core once the cylindrical member is threadably secured to the cylindrical core.

In some aspects, the arm can be integrally formed with the annular cap.

In some aspects, the present disclosure provides a method for assembling a bracket assembly. The method can include securing a cylindrical member and an annular cap to a supporting bar with the annular cap having an arm extending outwardly therefrom and a torque cartridge being arranged with the arm, and securing a frame to a clamping element that is coupled to the torque cartridge such that the frame is rotatable with the clamping element relative to the arm and to the supporting bar.

In some aspects, the method can further include, prior to securing the cylindrical member and the annular cap to the supporting bar, sliding a cylindrical core and the cylindrical member onto an end of the supporting bar with the annular cap being coupled with the cylindrical core, and engaging the cylindrical member with the cylindrical core to removably secure the cylindrical core at one of a plurality of positions along a length of the supporting bar.

In some aspects, the method can further include securing a second cylindrical member and a second annular cap to the supporting bar, and securing the frame to a second clamping element of the second annular cap.

Other features and aspects of this disclosure will be apparent from the following description and the accompanying drawings.

BRIEF DESCRIPTION OF DRAWINGS

The accompanying drawings illustrate various embodiments of systems, methods, and various other aspects of the disclosure. Any person with ordinary skill in the art will appreciate that the illustrated element boundaries (e.g. boxes, groups of boxes, or other shapes) in the drawings represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Nonlimiting and non-exhaustive descriptions are described with reference to the following drawings. The components in the drawings are not necessarily to scale, with emphasis instead being placed upon illustrating principles.

DETAILED DESCRIPTION

Some embodiments of this disclosure will now be discussed in detail. The words "comprising," "having," "containing," "including," and other forms thereof are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the preferred systems and methods are now described.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Figure 1A:
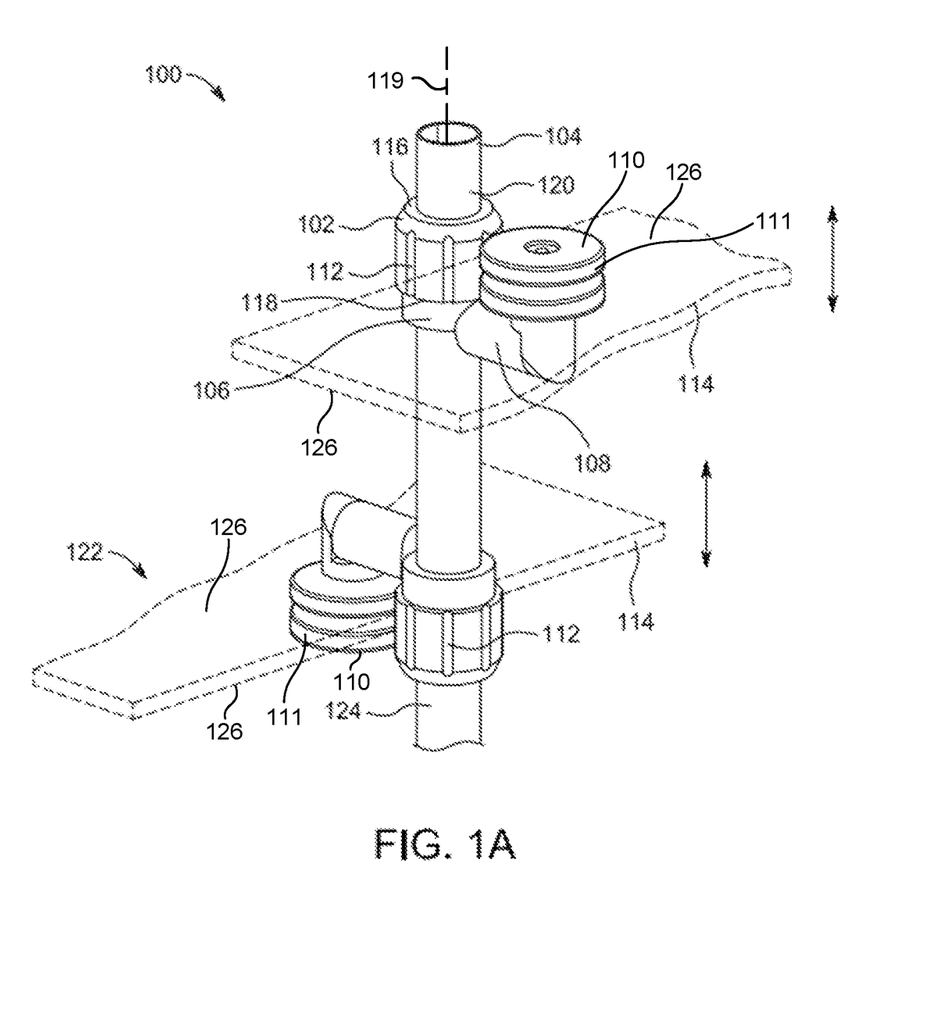
FIG. 1A is a perspective view of a bracket assembly in a first arrangement, according to an embodiment of the present disclosure.

FIG. 1A illustrates a perspective view of a bracket assembly for holding a plurality of frames in multiple positions with an adjustable height, according to an embodiment. FIG. 1A is described in conjunction with FIGS. 1B-5A.

A first bracket assembly 100 may be provided for holding a plurality of frames in multiple positions without requiring penetration of corners of the frames. The first bracket assembly 100 may comprise a cylindrical member 102, a supporting bar 104, an annular cap 106, a torque cartridge housing 108, a clamping element 110, a plurality of axial grooves 112, and a plurality of frames 114. The cylindrical member 102 may comprise a first opening 116 and a second opening 118 with a cylindrical member axis 117 extending through the first and second openings 116, 118. In one embodiment, the first opening 116 of the cylindrical member 102 may be configured to receive a first part 120 of the supporting bar 104. In one embodiment, the first part 120 of the supporting bar 104 may be referred to as an upper side of the supporting bar 104. In some implementations, the supporting bar 104 may be a hollow cylindrical column or a hollow cylindrical pipe having a longitudinal axis 119 (see FIGS. 1A and 1B). The cylindrical member 102 may be provided with the plurality of axial grooves 112 that may be integrally formed along an outer surface of the cylindrical member 102 and along a length of the cylindrical member 102. Further, the second opening 118 of the cylindrical member 102 may be covered with the annular cap 106. In one embodiment, an inner surface of the cylindrical member 102 may be threaded. In another embodiment, the annular cap 106 may be press fitted with the cylindrical member 102.

Figure 3:
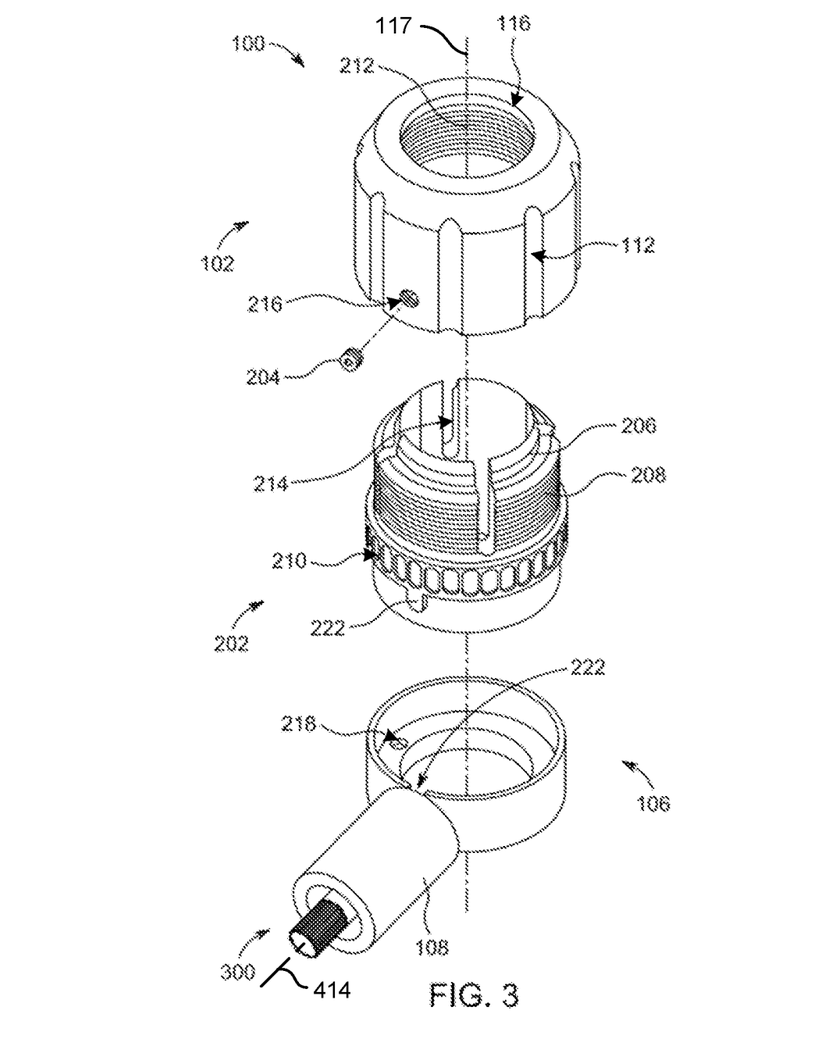
FIG. 3 is an exploded view of the bracket assembly of FIG. 1A coupled with a torque cartridge.

The torque cartridge housing 108 may be configured to be press fitted with the annular cap 106. In one embodiment, the torque cartridge housing 108 may be transversely press fitted at the annular cap 106 at one end. In one embodiment, the clamping element 110 may be configured to grip one or more of the plurality of frames 114, such as, e.g., via a clamping member 111. In the illustrated embodiment, the clamping member 111 is configured to engage opposing planar surfaces 126 (see FIG. 1A) of one or more frames of the plurality of frames 114. As shown in FIG. 3, the torque cartridge housing 108 may be a hollow section for housing a torque cartridge 300 therein. The clamping element 110 may be configured to have rotational movement provided by the torque cartridge 300. In one embodiment, the plurality of frames 114 within the clamping element 110 may be adjusted at different angles by rotating the torque cartridge 300.

Figure 1B:
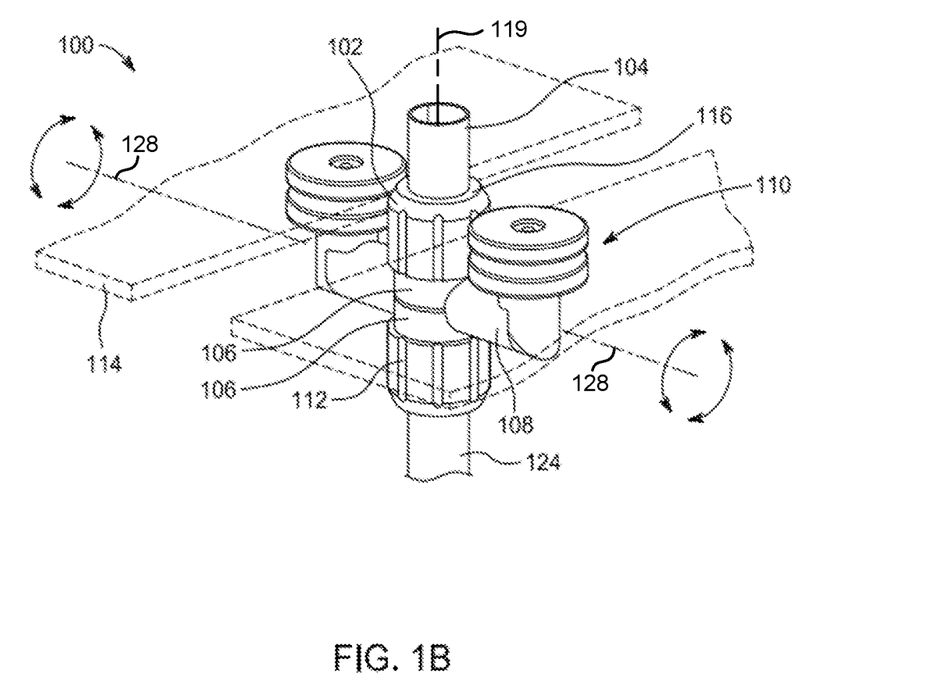
FIG. 1B is a perspective view of the bracket assembly of FIG. 1A in a second arrangement.

As shown in FIGS. 1A and 1B, a second bracket assembly 122 may be provided that may be similar to the first bracket assembly 100. In particular, the second bracket assembly 122 may be configured to receive a second part 124 of the supporting bar 104. In one embodiment, the second part 124 of the supporting bar 104 may be referred to as a lower side of the supporting bar 104. The second bracket assembly 122 may comprise a cylindrical member, a cylindrical core, an annular cap, a torque cartridge housing, and a torque cartridge that may be arranged in a similar fashion as described with respect to the first bracket assembly 100. In one embodiment, a plurality of cylindrical members of a plurality of bracket assemblies may be coupled with the supporting bar 104 in different arrangements. In one embodiment, a first arrangement may be shown in FIG. 1A, with the first bracket assembly 100 receiving the first part 120 of the supporting bar 104 and the second bracket assembly 122 receiving the second part 124 of the supporting bar 104. Further, as shown in FIG. 1A, the first bracket assembly 100 may be configured to hold one frame of the plurality of frames 114 with the clamping element 110 adjusted towards the first opening 116 of the cylindrical member 102 by the torque cartridge 300, and the second bracket assembly 122 may be configured to hold another frame of the plurality of frames 114 towards the second opening 118 of the cylindrical member 102 by the torque cartridge of the second bracket assembly 122, at some distance from the cylindrical member 102, and along a length of the supporting bar 104.

A second arrangement of the cylindrical members 102 of the first and second bracket assemblies 100, 122 holding the plurality of frames 114 is shown in FIG. 1B. As shown in FIG. 1B, the first bracket assembly 100 may receive the first part 120 of the supporting bar 104 and the second bracket assembly 122 may receive the second part 124 of the supporting bar 104. Further, the torque cartridge 300 of the cylindrical member 102 may be rotated to hold one frame of the plurality of frames 114 towards the first opening 116 of the cylindrical member 102 while the torque cartridge of the second bracket assembly 122 may be rotated to hold another frame of the plurality of frames 114 towards the first opening 116 of the cylindrical member 102. In one embodiment, the torque cartridge may provide a smooth pivoting movement to rotate the clamping element 110 between the first and second openings 116, 118 of the cylindrical member 102. In other words, and as shown in FIG. 1B, the respective clamping elements 110 of the first and second bracket assemblies 100, 122 may be rotated relative to longitudinal axes 128 of the respective cylindrical members 102 of the first and second bracket assemblies 100, 122 via the respective torque cartridges 300 of the first and second bracket assemblies 100, 122.

In one exemplary embodiment, the first and second bracket assemblies 100, 122 may be collectively referred to as a bracketing assembly. In one embodiment, the cylindrical member of the second bracket assembly 122 that receives the second part 124 of the supporting bar 104 may be moveable along the length of the supporting bar 104. In another embodiment, the cylindrical member of the second bracket assembly 122 may be moveable only towards the cylindrical member 102 of the first bracket assembly 100 receiving the first part 120 of the supporting bar 104. In another embodiment, the cylindrical member of the second bracket assembly 122 may be moveable only away from the cylindrical member 102 of the first bracket assembly 100 receiving the first part 120 of the supporting bar 104. Therefore, the supporting bar 104 may facilitate movement of the second bracket assembly 122 along its length towards or away from the first bracket assembly 100. In one embodiment, the first and second bracket assemblies 100, 122 may be arranged along the supporting bar 104 as shown in FIGS. 1A and 1B.

Figure 2:
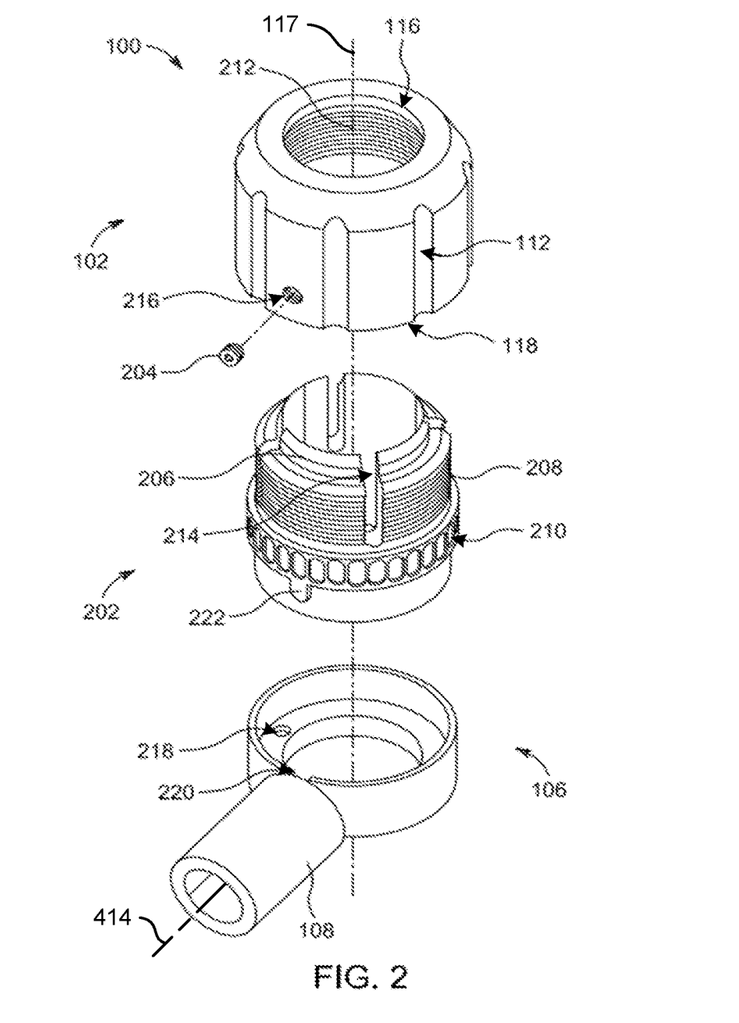
FIG. 2 is an exploded view of the bracket assembly of FIG. 1A.

Referring now to FIG. 2, an exploded view of the first bracket assembly 100 is illustrated. FIG. 2 is described in conjunction with FIGS. 1A, 1B, and 3-5B. As shown in FIG. 2, the first bracket assembly 100 may further comprise a cylindrical core 202 configured to be housed in the cylindrical member 102. In one embodiment, the cylindrical core 202 may be coupled from the second opening 118 of the cylindrical member 102 using a plurality of threaded fasteners 204. The cylindrical core 202 may comprise a stepped section 206, a threaded section 208, and a locking element 210. In one embodiment, the stepped section 206 of the cylindrical core 202 may be configured to receive the first part 120 of the supporting bar 104. In another embodiment, the threaded section 208 of the cylindrical core 202 may be coupled with an inner surface 212 of the cylindrical member 102. In one embodiment, the locking element 210 may be configured to lock the second opening 118 of the cylindrical member 102. In another embodiment, the locking element 210 may be a ring of small elements integrated around a circumference of the cylindrical core 202.

The cylindrical core 202 may comprise a plurality of slotted openings 214 integrated along a longitudinal axis of the cylindrical core 202. In one embodiment, the plurality of slotted openings 214 of the cylindrical core 202 may be configured to receive the plurality of threaded fasteners 204, when the threaded section 208 is coupled with the inner surface 212 of the cylindrical member 102. In one embodiment, the plurality of threaded fasteners 204 may be coupled to the plurality of open slotted elements 214 via a plurality of threaded holes 216. In such embodiments, the plurality of threaded holes 216 may be integrated over the cylindrical member 102 near the second opening 118 of the cylindrical member 102.

In one embodiment, the plurality of threaded fasteners 204 may comprise a spiraling ramp (not shown). In such embodiments, the spiraling ramp may be a simple mechanism for converting rotational motion into linear motion. In one exemplary embodiment, the spiraling ramp may convert a torque (i.e., rotational force) into a linear force. In one embodiment, the spiraling ramp may be referred to as threads. In such embodiments, the threads on an inner side the cylindrical member 102 may be referred to as an internal or female threads, and the threads on an outer side of the cylindrical core 202 are referred to as external or male threads. In such embodiments, an interaction of the internal threads of the cylindrical member 102 with the external threads of the cylindrical core 202 may convert the rotational movement to linear movement.

The annular cap 106 may be press fitted into the second opening 118 of the cylindrical member 102 for providing support to the cylindrical member 102. In one exemplary embodiment, the annular cap 106 may be coupled to the cylindrical core 202 using a plurality of screws (not shown). For example, the annular cap 106 may comprise a plurality of holes 218 integrated at a bottom of the annular cap 106 that may be configured to receive the plurality of screws to couple the annular cap 106 with the cylindrical core 202 and therefore to the cylindrical member 102. Further, the annular cap 106 may be provided with a grooved section 220 integrated on a circumference of the annular cap 106 that may be configured to receive an extruded section 222 integrated on the locking element 210 of the cylindrical core 202. In one embodiment, the extruded section 222 of the cylindrical core 202 may be configured to couple with the grooved section 220. In one exemplary embodiment, the cylindrical member 102, the cylindrical core 202, and the annular cap 106 are separate, unitary pieces comprising materials selected from the group consisting of: aluminum, steel, high strength carbon materials, carbon fiber, and carbon fiber-reinforced polymers. It can be noted that the supporting bar 104 may be coupled to the first bracket assembly 100 via the annular cap 106.

Referring now to FIG. 3, another perspective view of the bracket assembly coupled with the torque cartridge 300 is illustrated. FIG. 3 is described in conjunction with FIGS. 1A-2 and 4-5B. The torque cartridge housing 108 may be configured to be press fit with the annular cap 106. In an embodiment, the torque cartridge 300 housed within the torque cartridge housing 108 may be transversely fitted into the cylindrical member 102 and the cylindrical core 202.

Figure 4:
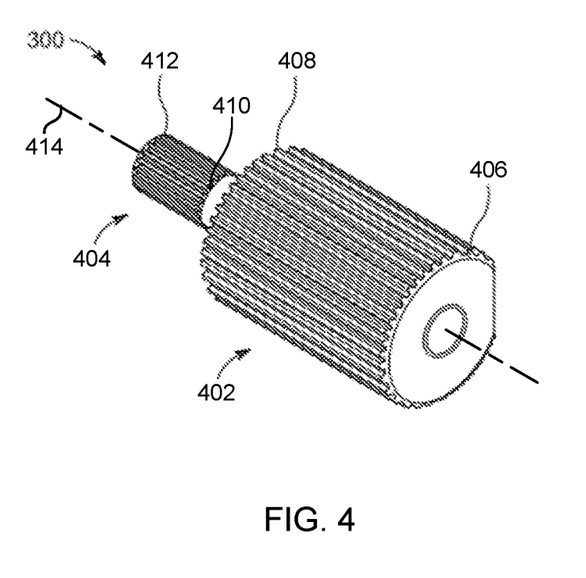
FIG. 4 is a perspective view of the torque cartridge of FIG. 3.

FIG. 4 illustrates a perspective view of the torque cartridge 300, and is described in conjunction with FIGS. 1A-3. In the illustrated embodiment, the torque cartridge 300 includes a first portion 402 and a second portion 404 that are coupled to each other and may provide an infinite smooth pivoting movement between the first and second portions 402, 404. In another embodiment, the infinite smooth pivoting movement of the torque cartridge 300 may be configured to provide a smooth rotary movement between the first and second portions 402, 404 of the torque cartridge 300. In one embodiment, the first portion 402 may be referred to as a cylindrical housing, and the second portion 404 may be referred to as a shaft. Further, the first portion 402 may comprise a first end 406 and a second end 408 and the second portion 404 may comprise a first end 410 and a second end 412, and a torque cartridge axis 414 extends through the first end 406 of the first portion 402 and the second end 412 of the second portion 404. In one embodiment, the first end 406 of the first portion 402 may be coupled with the cylindrical core 202 of the first bracket assembly 100.

Figure 5A:
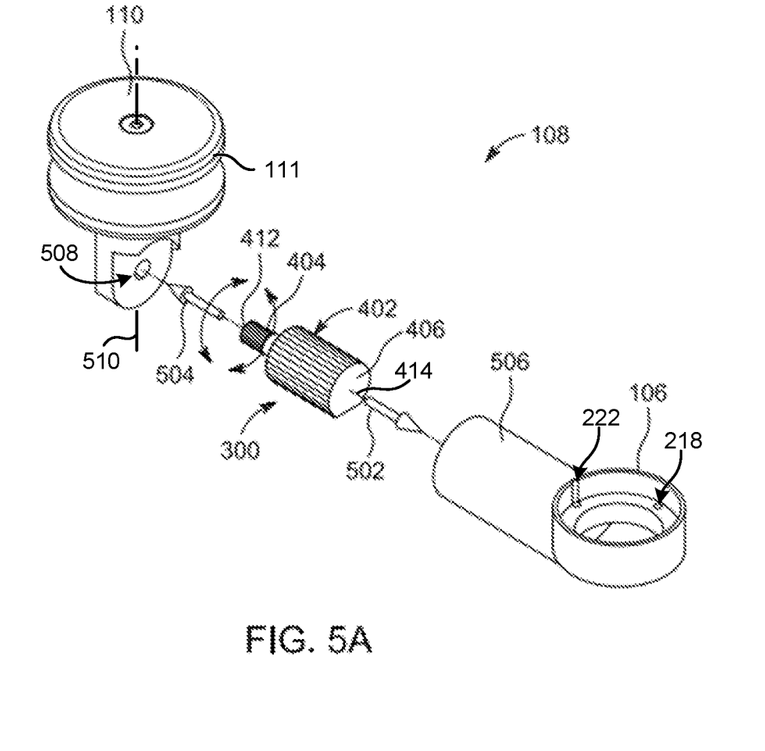
FIGS. 5A and 5B are exploded views of a torque cartridge housing and an annular cap of the bracket assembly of FIG. 1A.
Figure 5B:
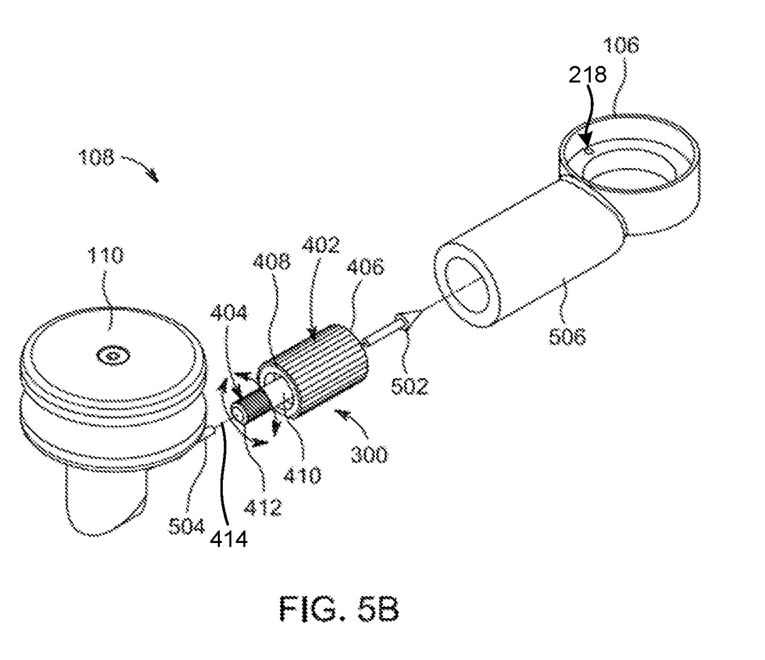

FIG. 5A and FIG. 5B illustrate exploded views of the torque cartridge housing 108 coupled with the clamping element 110, and are described in conjunction with FIGS. 1-4. The torque cartridge housing 108 may be coupled transversely with the annular cap 106, the cylindrical core 202, and the cylindrical member 102. In one embodiment, the torque cartridge housing 108 may be referred to as an orbit arm or simply an arm for holding the plurality of frames 114. In one embodiment, the torque cartridge housing 108 may be configured to receive the first end 406 of the first portion 402 of the torque cartridge 300, as shown by arrow 502. Further, the second end 412 of the second portion 404 of the torque cartridge 300 may be coupled with the clamping element 110, as shown by arrow 504. In addition, the clamping element 110 may be provided with an aperture 508 to receive the second end 412 of the second portion 404 of the torque cartridge 300. In the illustrated embodiment, the aperture 508 is disposed toward one end of the clamping element 110 opposite another end with the clamping member 111, and a clamping member axis 510 extends through the ends of the clamping element 110.

In one embodiment, the torque cartridge housing 108 may be a hollow cylindrical section 506 transversely press fit at one end with the annular cap 106 and open at another end to receive the torque cartridge 300. In another embodiment, the torque cartridge housing 108 may be coupled to the annular cap 106 using a press fit technique. Further, the torque cartridge 300 may provide a smooth pivoting or rotating movement due to the plate coupled between the second end 408 of the first portion 402 of the torque cartridge 300 and the first end 410 of the second portion 404 of the torque cartridge 300. In one embodiment, the clamping element 110 may be detachably attached to the torque cartridge 300. The clamping element 110 may be configured to hold the plurality of frames 114 which can be detached from the first bracket assembly 100 by loosening the clamping element 110. Thus, such a bracket assembly with the torque cartridge 300 facilitates a smooth pivoting movement of the plurality of frames 114.

The features of the present disclosure will be apparent with reference to the foregoing description and attached drawings. In the description and drawings, particular embodiments of the invention have been disclosed in detail as being indicative of some of the ways in which the principles of the disclosed technology may be employed, but it is understood that the present disclosure is not limited correspondingly in scope. Features that are described and/or illustrated with respect to one embodiment may be used in the same way or in a similar way in one or more other embodiments and/or in combination with or instead of the features of the other embodiments.

While the preferred embodiment of the disclosed technology has been illustrated and described, as noted above, many changes can be made without departing from the spirit and scope of the present disclosure. For example, aspects of the present disclosure may be adopted on alternative operating systems. Accordingly, the scope of the present disclosure is not limited by the disclosure of the preferred embodiment. Instead, the scope of the present disclosure should be determined entirely by reference to the claims that follow.

I claim:

1. A bracket assembly comprising:
a supporting bar;
a cylindrical member configured to slidably receive the supporting bar;
an annular cap configured to removably couple with the cylindrical member;
an arm extending outwardly from the annular cap;
a torque cartridge including a first portion and a second portion rotatably coupled with the first portion, the first portion being received within the arm such that the second portion is rotatable relative to the first portion and to the arm; and
a clamping element configured to releasably hold a frame, the clamping element being coupled with the second portion of the torque cartridge at an outer end of the arm such that the clamping element is rotatable relative to the arm and to the annular cap, while the first portion remains stationary relative to the annular cap and the supporting bar.

2. The bracket assembly of claim 1, wherein the clamping element is rotatable relative to the arm in an angular range of at least 360 degrees about a longitudinal axis of the arm.

3. The bracket assembly of claim 2, wherein the clamping element is securable in one of a plurality of rotational positions relative to the arm via only the torque cartridge.

4. The bracket assembly of claim 2, wherein the longitudinal axis of the arm is substantially perpendicular to a longitudinal axis of the supporting bar.

5. The bracket assembly of claim 1, wherein the annular cap is configured to slidably receive the supporting bar.

6. The bracket assembly of claim 5, wherein the cylindrical member and the annular cap are removably securable at one of a plurality of positions along a length of the supporting bar when the annular cap is coupled with the cylindrical member.

7. The bracket assembly of claim 1, wherein at least a portion of the supporting bar has a shape of a hollow cylinder.

8. The bracket assembly of claim 1, wherein the bracket assembly includes a first cylindrical core, the annular cap is a first annular cap having a first arm, and the clamping element is a first clamping element, and wherein the bracket assembly further comprises:
- a second cylindrical member configured to slidably receive the supporting bar;
- a second cylindrical core configured to slidably receive the supporting bar and to engage the second cylindrical member;
- a second annular cap configured to engage the second cylindrical core, the second annular cap having a second arm extending outwardly therefrom; and
- a second clamping element that is rotatable relative to the second arm.

9. The bracket assembly of claim 8, wherein the first and second clamping elements are configured to releasably hold the frame.

10. The bracket assembly of claim 8, wherein the first clamping element is configured to releasably hold a first frame, and the second clamping element is configured to releasably hold a second frame.

11. A bracket assembly comprising:
- a supporting bar;
- a cylindrical member configured to slidably receive the supporting bar;
- a cylindrical core configured to slidably receive the supporting bar and to engage the cylindrical member;
- an annular cap configured to engage the cylindrical core, the annular cap having an arm extending outwardly therefrom along a longitudinal axis;
- a torque cartridge including a first portion and a second portion rotatably coupled with the first portion, the first portion being received within the arm such that the second portion is rotatable relative to the first portion and to the arm; and
- a clamping element coupled with the second portion of the torque cartridge such that the clamping element is rotatable about the longitudinal axis, while the first portion remains stationary relative to the annular cap or the supporting bar.

12. The bracket assembly of claim 11, wherein the annular cap is configured to slidably receive the supporting bar such that the cylindrical member, the cylindrical core, and the annular cap are removably securable at one of a plurality of positions along a length of the supporting bar.

13. The bracket assembly of claim 11, wherein the cylindrical member is configured to removably receive one end of the cylindrical core, and the annular cap is configured to removably receive another end of the cylindrical core, opposite the cylindrical member.

14. The bracket assembly of claim 13, wherein the cylindrical member is threadably securable to the cylindrical core.

15. The bracket assembly of claim 14, wherein the cylindrical core is configured to clamp a portion of the supporting bar when the cylindrical member is threadably secured to the cylindrical core to movably secure the cylindrical core and the annular cap to the supporting bar.

16. The bracket assembly of claim 15, wherein the cylindrical core includes one or more locking elements that is configured to prevent rotation of the cylindrical member relative to the cylindrical core once the cylindrical member is threadably secured to the cylindrical core.

17. The bracket assembly of claim 11, wherein the arm is integrally formed with the annular cap.

18. A method of assembling a bracket assembly, the method comprising:
- securing a cylindrical member and an annular cap to a supporting bar, the annular cap having an arm extending outwardly therefrom and a torque cartridge including a first portion that is arranged within the arm; and
- securing a frame to a clamping element that is coupled to the torque cartridge such that the frame is rotatable with the clamping element relative to the arm and to the supporting bar, while the first portion remains stationary relative to the arm or the supporting bar.

19. The method of claim 18, further comprising, prior to securing the cylindrical member and the annular cap to the supporting bar:
- sliding a cylindrical core and the cylindrical member onto an end of the supporting bar, the annular cap being coupled with the cylindrical core; and
- engaging the cylindrical member with the cylindrical core to removably secure the cylindrical core at one of a plurality of positions along a length of the supporting bar.

20. The method of claim 18, further comprising:
- securing a second cylindrical member and a second annular cap to the supporting bar; and
- securing the frame to a second clamping element of the second annular cap.

21. The bracket assembly of claim 1, wherein the second portion is coupled to the clamping element without a fastener.

22. The bracket assembly of claim 1, wherein the clamping element is removably coupled to the second portion.

23. The bracket assembly of claim 1, wherein the clamping element includes a blind hole that receives the second portion.

* * * * *